(12) United States Patent
Colquhoun

(10) Patent No.: US 8,356,445 B1
(45) Date of Patent: Jan. 22, 2013

(54) ROTATING PLANT STAND

(75) Inventor: Jason Colquhoun, Surrey (CA)

(73) Assignee: Crystal Mountain Manufacturing, Langley (CA)

( * ) Notice: Subject to any disclaimer, the term of this patent is extended or adjusted under 35 U.S.C. 154(b) by 0 days.

(21) Appl. No.: 13/347,691

(22) Filed: Jan. 10, 2012

(51) Int. Cl.
*A47G 7/04* (2006.01)

(52) U.S. Cl. .................................. 47/65; 47/39

(58) Field of Classification Search .......... 47/39, 65
See application file for complete search history.

(56) References Cited

U.S. PATENT DOCUMENTS

| | | | | |
|---|---|---|---|---|
| 1,468,247 | A | * | 9/1923 | Patten ........................ 108/21 |
| 3,042,350 | A | * | 7/1962 | Lencioni ..................... 47/40.5 |
| 3,360,885 | A | * | 1/1968 | St Clair ...................... 47/39 |
| 4,005,843 | A | | 2/1977 | Wengel |
| 4,026,067 | A | | 5/1977 | Wengel |
| 4,175,354 | A | * | 11/1979 | Anderson ................... 47/39 |
| 4,583,323 | A | | 4/1986 | Graves et al. |
| 4,969,290 | A | * | 11/1990 | Skoretz ...................... 47/39 |
| 5,878,989 | A | * | 3/1999 | Allman ....................... 248/522 |
| 5,921,022 | A | * | 7/1999 | Baker ......................... 47/40.5 |
| 6,128,854 | A | | 10/2000 | Chaney |
| 6,230,440 | B1 | | 5/2001 | Deutsch |
| 7,020,999 | B1 | * | 4/2006 | Stouffer et al. ............ 47/67 |
| 7,406,799 | B1 | * | 8/2008 | Stouffer et al. ............ 47/67 |
| 8,132,359 | B1 | * | 3/2012 | Hudak ........................ 47/39 |
| 8,166,701 | B1 | * | 5/2012 | Duff, Sr. .................... 47/39 |
| 2005/0029426 | A1 | | 2/2005 | Washick |
| 2005/0081439 | A1 | | 4/2005 | Lehman et al. |
| 2009/0229180 | A1 | | 9/2009 | Rich et al. |

* cited by examiner

*Primary Examiner* — David Parsley
(74) *Attorney, Agent, or Firm* — Cotman IP Law Group

(57) ABSTRACT

A rotating stand includes a turner casing base and a turner casing top rotatably coupled with the turner casing base. A motor drive assembly is coupled with the turner casing base, wherein the motor drive assembly is configured to rotate the turner casing top relative to the turner casing base. A motor controller is coupled with the turner casing base, wherein the motor controller is configured to cause the motor drive assembly to rotate the turner casing top relative to the turner casing base using alternating clockwise and counter-clockwise rotational motions.

9 Claims, 5 Drawing Sheets

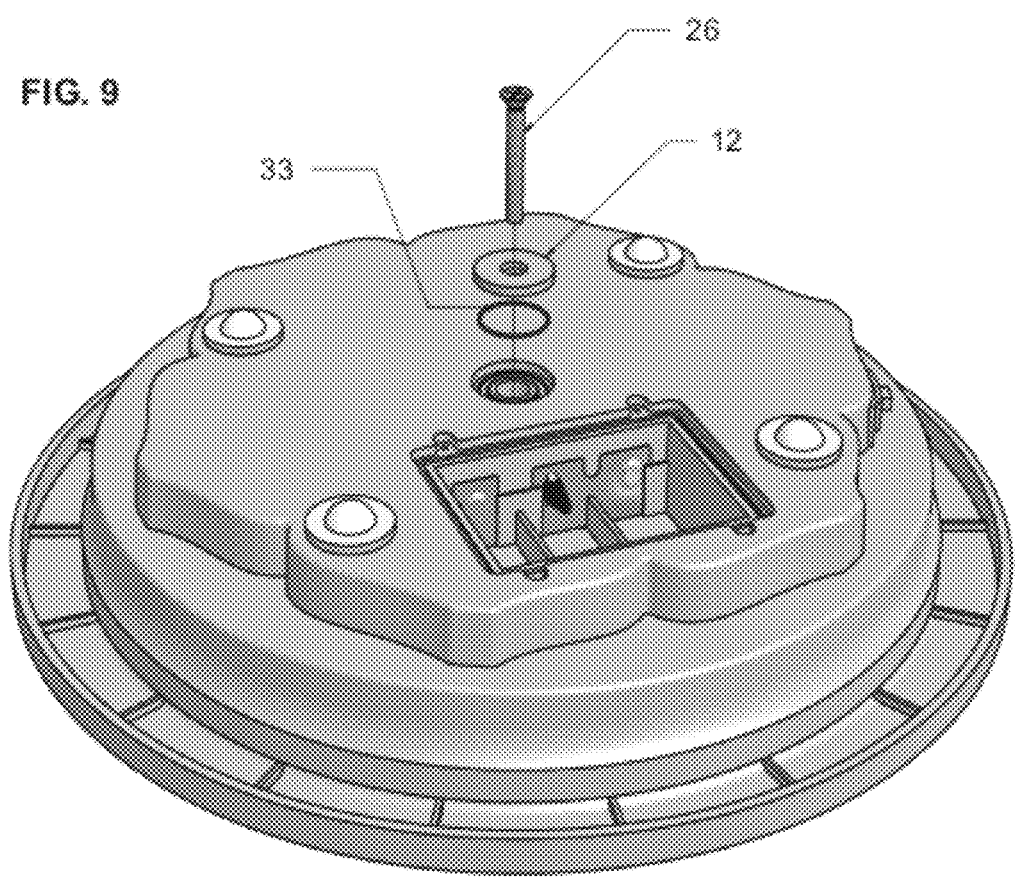

ROTATING PLANT STAND

BACKGROUND OF THE INVENTION

1. Field of the Invention

The present invention relates to the field of gardening.

2. Description of the Related Art

Motorized plant stands that rotate at set speeds are of use in the field of gardening to provide plotted plants symmetrically uniform sunlight without human intervention. Often, hoses or wires are attached to the plant or to the plot that is placed onto the rotating plant stand. The hoses or wires are prone to becoming entangled, wound, or otherwise rendered damaged or ineffectual due to the rotational motion of the motorized plant stands.

U.S. Pat. No. 4,026,067 discloses a plant turntable having a power supply for the rotation of a potted plant and the like. The turntable includes an imperforate disc supported by a ring-mounted ball bearing assembly for the support of the potted plant which is driven by the shaft of a geared motor mounted directly below in a base. A transverse pin through the drive shaft engages a slot in the turntable axle to provide the driving torque for rotating the turntable. The base forms a motor and battery enclosure.

U.S. Pat. No. 4,005,843 discloses a rotator for a hanging display such as a mobile, hanging plant or the like having a self-contained power supply. The apparatus comprises a cylinder for containing flashlight batteries adjacent one another and for containing motor means to drive a geared shaft by which a display is suspended and rotated.

U.S. Pat. No. 6,128,854 discloses a potted plant turntable including a base and a rotating dish. The rotating dish supports a potted plant which is slowly rotated with the dish to allow even exposure of the plant to sunlight. The dish rests on a bearing collar of the base and is gear driven by an AC or solar powered motor. A rheostat controls the rotation speed in increments of hours, days, weeks, or months. A programmable timer keypad provides for pre-changing of the different speed settings.

These rotating stands fail to provide a simple and efficient feature that prevents hoses or wires from becoming entangled, wound, or otherwise rendered damaged or ineffectual.

To overcome the problems and limitations described above there is a need for a rotating stand that maintains the automation advantages of a motorized rotating plant stand but also prevents hoses or wires from becoming entangled, wound, or otherwise rendered damaged or ineffectual.

BRIEF SUMMARY OF THE INVENTION

One or more embodiments of the invention enable a rotating stand. In some exemplary embodiments of the present invention, a rotating stand includes a turner casing base and a turner casing top rotatably coupled with the turner casing base. A motor drive assembly is coupled with the turner casing base, wherein the motor drive assembly is configured to rotate the turner casing top relative to the turner casing base. A motor controller is coupled with the turner casing base, wherein the motor controller is configured to cause the motor drive assembly to rotate the turner casing top relative to the turner casing base using alternating clockwise and counter-clockwise rotational motions.

In some exemplary rotating stands, the motor controller is further configured to cause the motor drive assembly to rotate the turner casing top a constant rotational distance in relation to the turner casing base before reversing the rotational direction.

In some exemplary rotating stands, the motor controller is further configured to cause the motor drive assembly to rotate the turner casing top in relation to the turner casing base at an adjustable rotational speed.

In some exemplary rotating stands, the adjustable rotational speed range is further configured to be from one revolution per minute to one revolution per day.

Some exemplary rotating stands further comprise at least one solar power cell coupled with the rotating stand.

In some exemplary rotating stands, the motor drive assembly and the motor controller are further configured to be powered by the solar power cells.

Some exemplary rotating stands further comprise a photocell sensor coupled with the rotating stand, wherein the photocell sensor is configured to send electrical signals to the motor controller.

In some exemplary rotating stands, the motor controller is further configured to cause the motor drive assembly to rotate the turner casing top relative to the turner casing base only when the photocell detects light.

BRIEF DESCRIPTION OF THE DRAWINGS

The above and other aspects, features and advantages of the invention will be more apparent from the following more particular description thereof, presented in conjunction with the following drawings wherein:

FIG. 9 is a perspective view of the turner casing base in accordance with one or more exemplary embodiments of a rotating stand.

DETAILED DESCRIPTION

A rotating stand will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
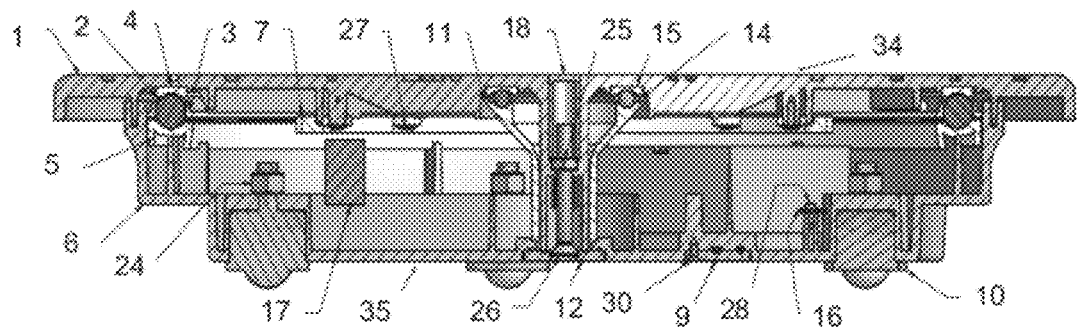
FIG. 1 illustrates an exemplary embodiment of a rotating stand.

FIG. 1 illustrates a rotating stand (100) in accordance with one or more embodiments of a rotating plant stand. The rotating stand (100) includes a turner casing top (1) positioned above a turner casing base (6). The turner casing base (6) and the turner casing top (1) is formed from plastic or any combination of suitable materials such as metal, wood, and ceramics. The turner casing top (1) has an upper surface (34) facing an upward direction. The turner casing base (6) has a lower surface (35) facing a downward direction. In some exemplary embodiments, the turner casing top (1) and the turner casing base (6) are each circular disk shaped. In some exemplary embodiments, the lower surface (35) of the turner casing base (6) is substantially parallel to the upper surface (34) of the turner casing top (1). The upper surface (34) of the turner casing top (1) grants provides a surface for a plotted plant. The turner casing top (1) is rotatably attached to the turner casing base (6). In some exemplary embodiments, the turner casing top (1) is rotatable relative to the turner casing base (6) about an axis that runs through a geometric center of the turner casing top (1) and a geometric center of the turner casing base (6).

Figure 2:
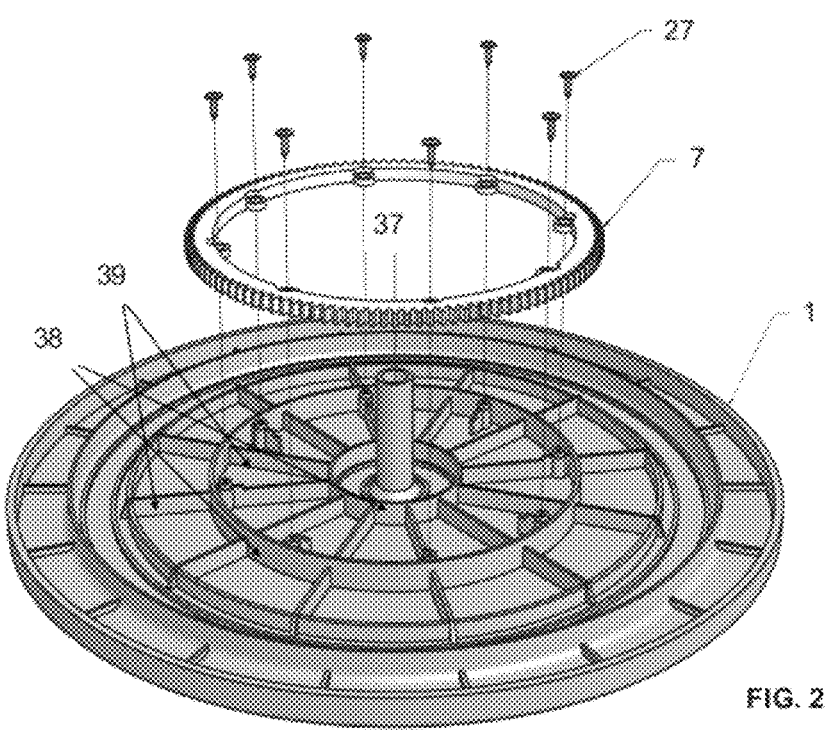
FIG. 2 is a perspective view of a turner casing top in accordance with one or more exemplary embodiments of a rotating stand.

FIG. 2 illustrates the turner casing top of a rotating stand (100) in accordance with one or more embodiments of a rotating plant stand. In some embodiments, the turner casing top (1) has an under-side that is opposite of the upper surface (34) with a number of concentric ring shaped projections (38). In some embodiments, a number of radial projections (39) run between the concentric ring shaped projections (38). The concentric ring shaped projections (38) and radial projections (39), each and in combination, provide extra stiffness and strength to the turner casing top (1). In some embodiments, the turner casing top (1) has a top center circular hole in the turner casing top's (1) center. In some embodiments, a hollow tube (37) is attached around the top center circular hole extending in the downward direction from the under-side of the turner casing top (1).

In some embodiments, a ring gear (7) is coupled to one of the concentric ring shaped projections (38) on the turner casting top (1). In some embodiments, the ring gear (7) has outward facing teeth. Alternatively in other embodiments, the ring gear (7) has inward facing teeth. The ring gear may (7) is coupled to the turner casing top (1) using any suitable method such as tapping screws (27) or adhesives. If tapping screws (27) are used as the mounting method, the ring gear (7) and the under-side of the turner casing top (1) will have corresponding screw holes.

Figure 3:
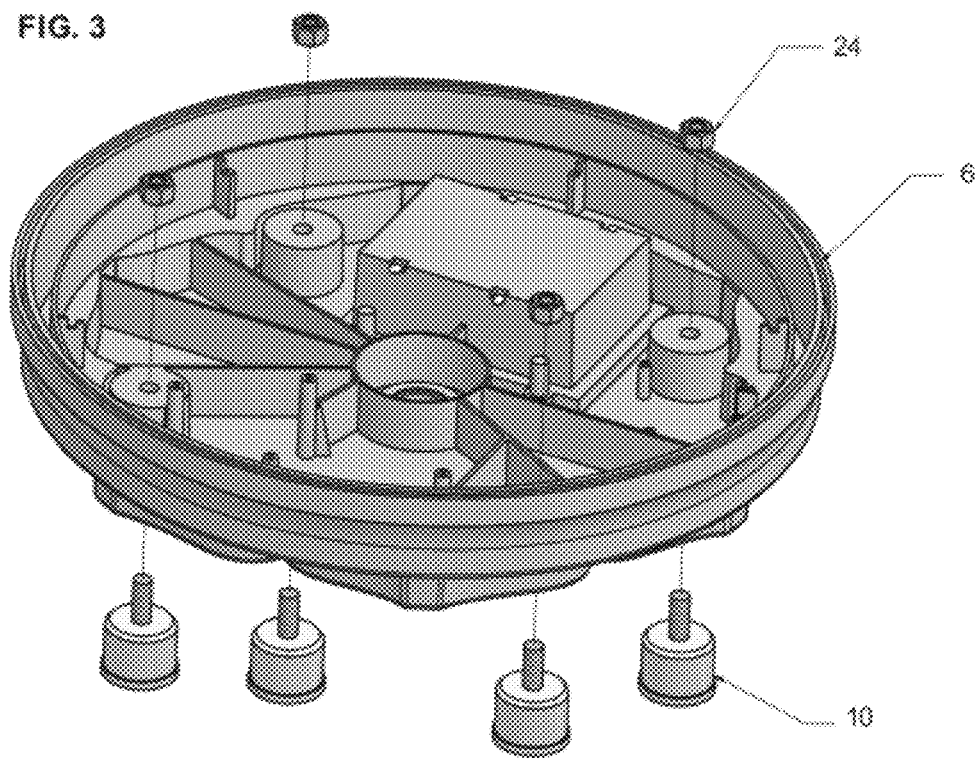
FIG. 3 is a perspective view of a turner casing base in accordance with one or more exemplary embodiments of a rotating stand.

FIG. 3 illustrates the turner casing base (6) of a rotating stand (100) that is supported on movement restricting feet (10) in accordance with one or more embodiments of a rotating plant stand. The movement restricting feet (10) is made of rubber or any combination of suitable materials. In some embodiments, the rotating stand (100) has three or more movement restricting feet (10). The movement restricting feet are coupled to the lower surface (35). In some embodiments, the movement restricting feet (10) are shaped as threaded bolts with cylindrical shaped heads. A head end of the threaded bolt has a partially spherical extrusion. The lower surface (35) has recesses (36) of size and shape to allow insertion of the movement restricting feet (10). The threaded bolt of the movement restricting feet mates with a hex nut (24) through the circular hole in the recess (36).

Figure 4:
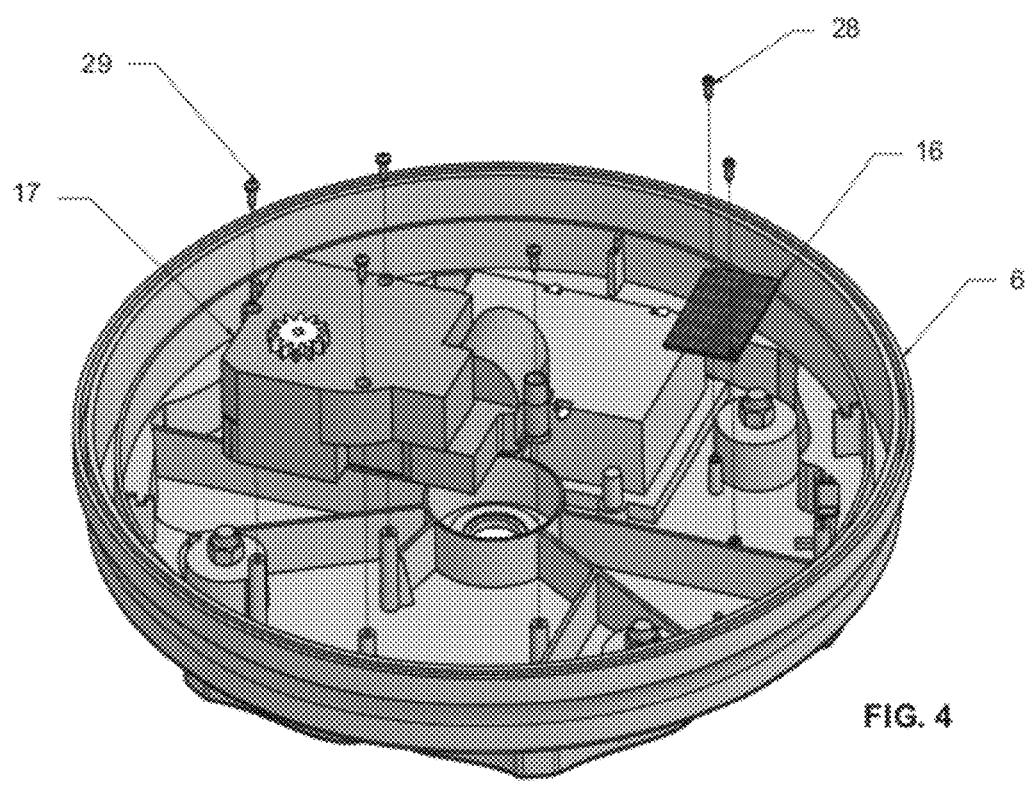
FIG. 4 is a perspective view of the turner casing base in accordance with one or more exemplary embodiments of a rotating stand.

FIG. 4 illustrates a motor drive assembly (17) mounted to the upper-side of the turner casing base (6) in accordance with one or more embodiments of a rotating plant stand. In some embodiments, the motor drive assembly (17) is coupled to the turner casing base (6) by screwing screws into corresponding screw holes in the motor drive assembly and the upper-side of the turner casing base (6) or by any other suitable method such as double-sided tape or adhesive. A drive gear is attached to a drive rotor of the motor drive assembly (17). The drive gear has teeth that mate with teeth from the ring gear (7) on the turner casing top. The motor drive assembly (17) is configured to generate rotational force between the turner casing top (1) and the turner casing base (6).

In some embodiments, a motor controller (16) is mounted to the upper-side of the turner casing base (6). The motor controller (16) is electrically coupled to the motor drive assembly (17). The motor controller (16) is configured to cause the motor drive assembly (17) to rotate the turner casing top (1) in relation to the turner casing base (6) using alternating clockwise and counter-clockwise turns. For example, when the motor controller is configured to do so, the turner casing top (1) may be rotated relative to the turner casting base (6) one rotation then rotated in the opposite direction one rotation then repeating. This back and forth rotational motion is advantageous over single directional rotational motion because it helps prevent water hoses, electrical wires, and other such items that may be attached to a plotted plant that is supported by the rotating stand (100) from becoming entangled, wound, or otherwise rendered damaged or ineffectual.

In some embodiments, the motor controller (16) is configured to rotate the turner casing top (1) relative to the turner casing base (6) at a range of speeds from stationary to one revolution per minute to one revolution per month. In some embodiments, a switch actuator (8) is mounted to the turner casing base (6) to allow changing the speed of rotation for the motor controller (16).

Figure 5:
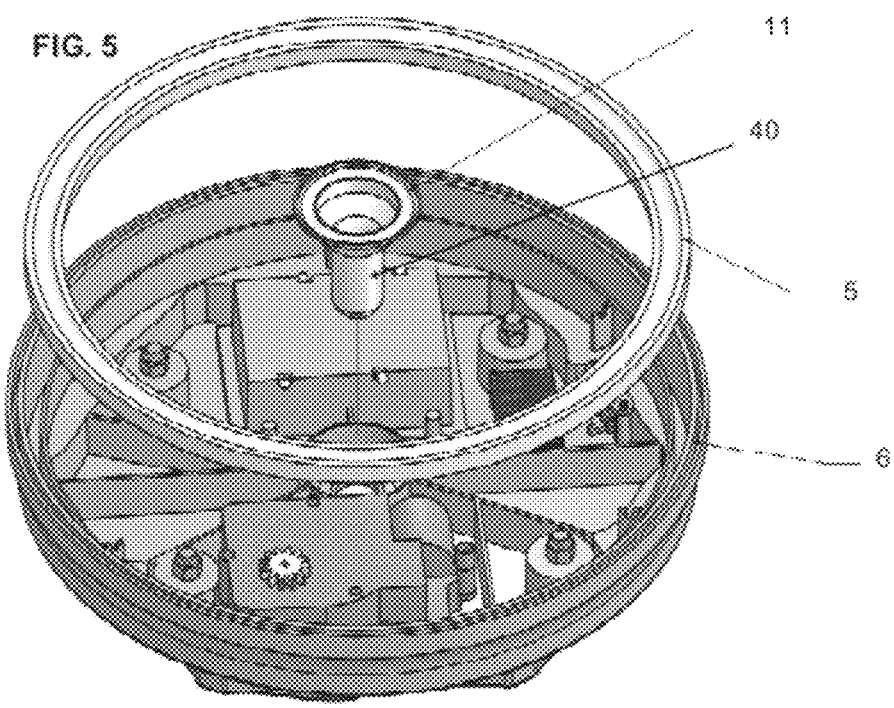
FIG. 5 is a perspective view of the turner casing base in accordance with one or more exemplary embodiments of a rotating stand.

FIG. 5 illustrates the turner casing base (6) of a rotating stand (100) in accordance with one or more embodiments of a rotating plant stand. The turner casing base (6) has an upper-side that is opposite of the lower surface (35). In some embodiments, the turner casing base (6) has a base center circular hole in the turner casing base's (6) center. A large diameter lower bearing race (5) and a small diameter lower bearing race (11) are each ring shaped with a grooved channel facing the upward direction. In some embodiments, the large diameter lower bearing race (5) is coupled to the upper-side of the turner casing base (6) using any suitable method such as adhesives or double-sided foam tape. The small diameter lower bearing race (11) is coupled to a larger end of a funnel structure (4). In some embodiments, a smaller end of the funnel structure (4) has a hallow cylinder that extends in the downward direction with its end attached to the base center circular hole on the upper-side of the turner casing base (6). The hallow cylinder has an inner diameter that is slightly larger than an outer diameter of the hallow tube (37). This structure allows the hallow tube (37) which extends in the downward direction from the turner casing top to fit inside the hallow cylinder of the funnel structure (4) on the turner casing base (6).

Figure 6:
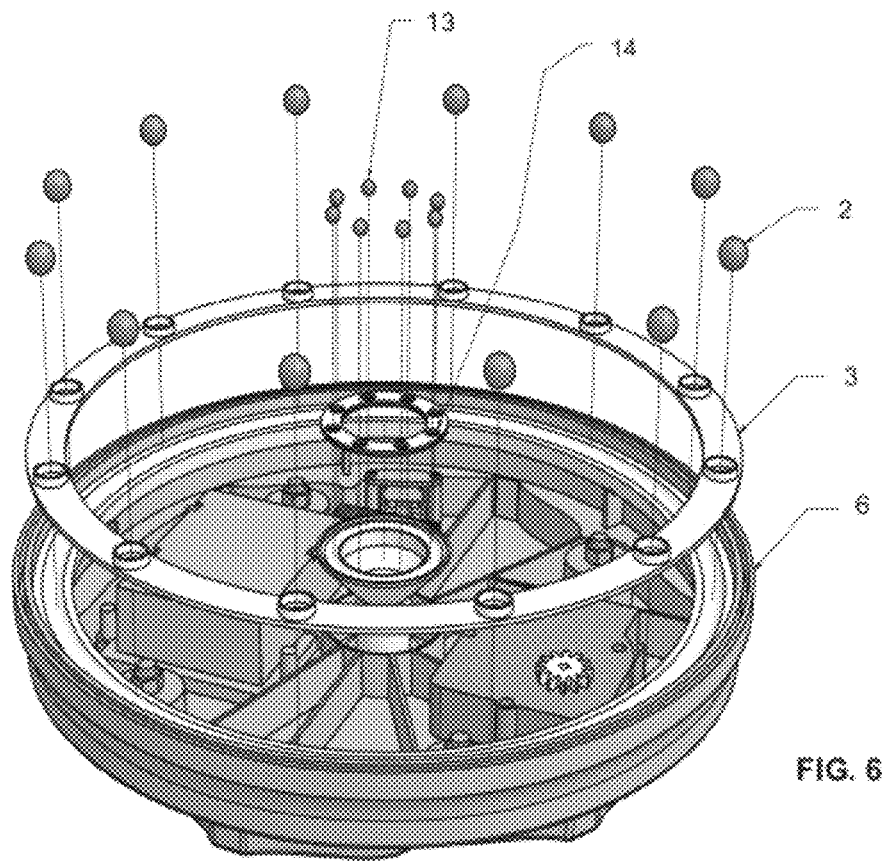
FIG. 6 is a perspective view of the turner casing base in accordance with one or more exemplary embodiments of a rotating stand.

FIG. 6 illustrates the turner casing base (6) of a rotating stand (100) in accordance with one or more embodiments of a rotating plant stand. In some embodiments, a large diameter bearing cage (3) may be positioned but not attached above the large diameter bearing race (5). Similarly, a small diameter bearing cage (14) is positioned but not attached above the small diameter bearing race (11). In some embodiments, the large diameter bearing cage (3) is ring shaped with a multitude of large circular holes, each slightly larger in diameter than the diameter of a large bearing (2), evenly spaced along the large diameter bearing cage (3). The small diameter bearing cage (14) is ring shaped with a multitude of small circular holes, each slightly larger in diameter than the diameter of a small bearing (13), evenly distanced apart along the small diameter bearing cage (14). Each large bearing (2) and each small bearing (13) is formed from steel or a combination of suitable materials such as plastic, ceramics, and metal. A large bearing (2) is inserted into each circular hole of the large diameter bearing cage (3). A small bearing (13) is inserted into each circular hole of the small diameter bearing cage (14).

Figure 7:
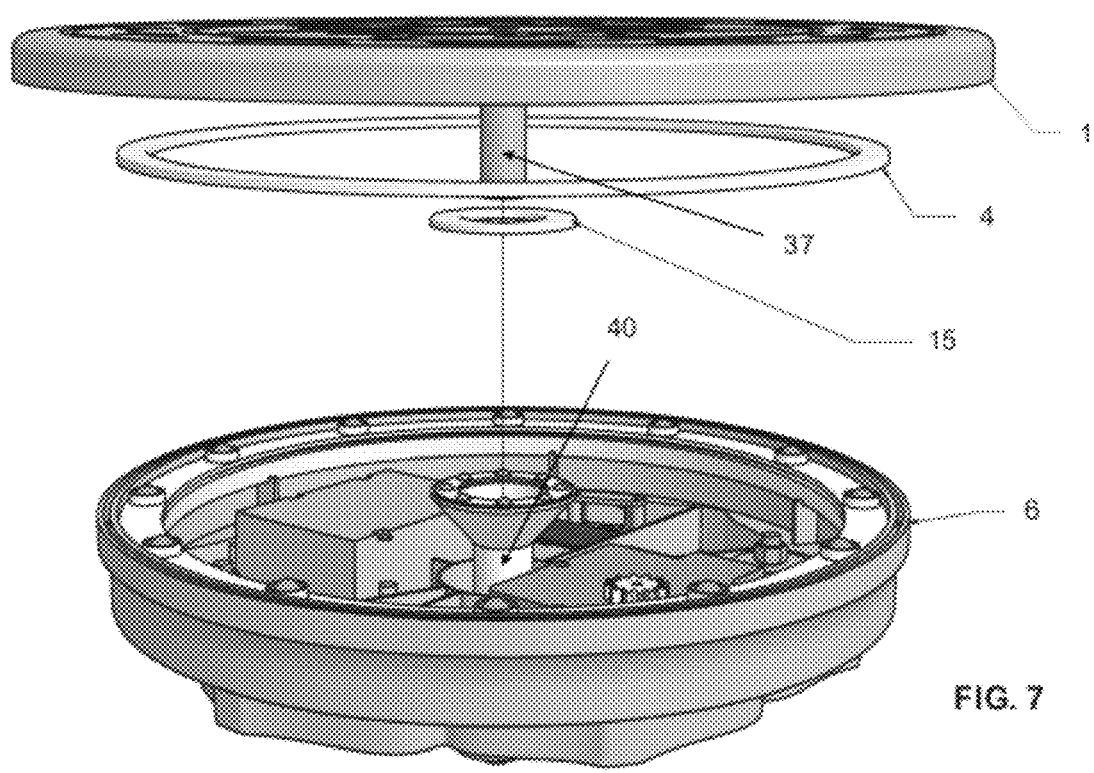
FIG. 7 is a perspective view of an exemplary embodiment of a rotating stand.

FIG. 7 illustrates the turner casing top (1) and the turner casing base (6) of a rotating stand (100) in accordance with one or more embodiments of a rotating plant stand. In some embodiments, a large diameter upper bearing race (4) is positioned but not attached above the large diameter bearing cage (3). Similarly, a small diameter upper bearing race (15) is positioned but not attached above the small diameter bearing cage. In some embodiments the large diameter upper bearing race (4) is identical to the large diameter lower bearing race (5) but positioned to have the grooved channel facing the downward direction. The small diameter upper bearing race (15) is identical to the small diameter lower bearing race (11) but positioned to have the grooved channel facing the downward direction. The large diameter upper bearing race (4), the large diameter bearing cage (3), and the large diameter lower bearing race (5) have essentially equal diameters. The small diameter upper bearing race (15), the small diameter bearing cage (14), and the small diameter lower bearing race (11) may have essentially equal diameters. The turner casing top's (1) weight is supported by the larger diameter upper bearing race (4) and the small diameter upper bearing race (15). In some embodiments, the large diameter upper bearing race (4) and the small diameter upper bearing race (15) are positioned adjacent but not attached to the turner casing top (1). In some alternative embodiments, the large diameter upper bearing race (4) and the small diameter upper bearing race (15) are attached to the turner casing top using any suitable method such as adhesives or double-sided foam tape.

Figure 8:
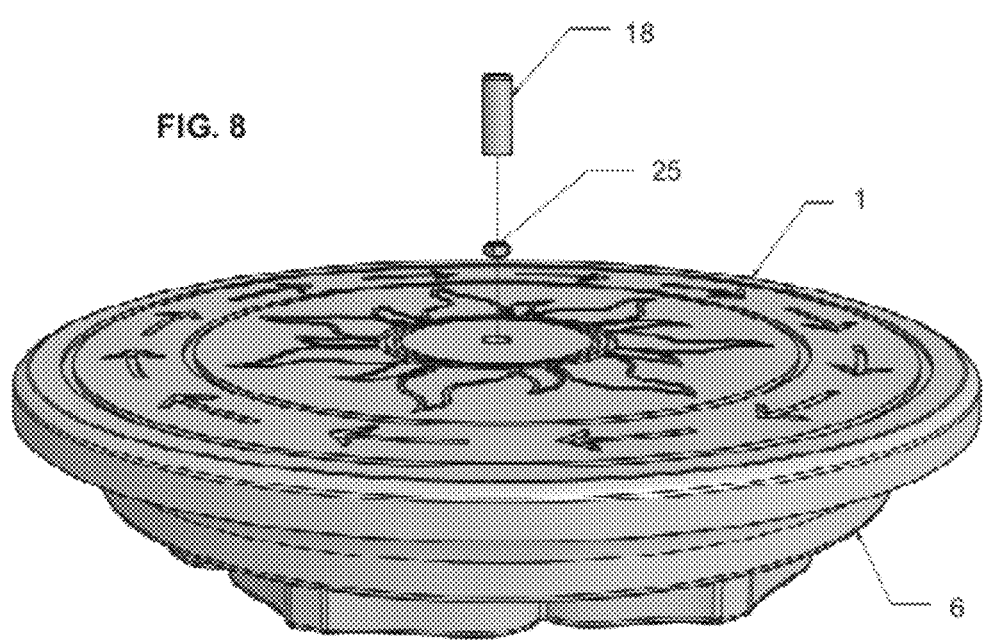
FIG. 8 is a perspective view of an exemplary embodiment of a rotating stand.

FIG. 8 illustrates a rotating stand (100) in accordance with one or more embodiments of a rotating plant stand. In some embodiments, the turner casing top (1) is prevented from detaching from the turner casing base (6). A hex nut (25) followed by a center post plug (18) are inserted into the hollow tube (37) on the turner casing top (1). An O-ring, a washer, followed by a screw (26) are inserted into the hallow cylinder of the funnel structure (4) on the turner casing base (6). The screw (26) is screwed into the hex nut (25) and center post plug (18) to prevent the turner casing top (1) from detaching from the turner casing base (6).

FIG. 9 illustrates the turner casing base (6) of a rotating stand (100) in accordance with one or more embodiments of a rotating plant stand. The turner casing base (6) has a battery recess which fits one or multiple batteries. The motor controller (16) and motor drive assembly (17) are powered by any suitable means such as by battery, by generator, or by power outlet. In some embodiments, batteries are used to power the rotating stand (100). In some embodiments, a battery cover O-ring is placed between the battery recess and a battery case cover (9). The battery case cover (9) is attached to the battery recess with screws (30).

What is claimed is:

1. A rotating stand, comprising:
   a turner casing base;
   a small diameter lower bearing race coupled to a funnel structure of said turner casing base;
   a large diameter lower bearing race coupled to said turner casing base, wherein said large diameter lower bearing race is concentric with said small diameter lower bearing race;
   a turner casing top rotatably coupled with the turner casing base;
   a small diameter upper bearing race coupled to said turner casing top;
   a large diameter upper bearing race coupled to said turner casing top, wherein said large diameter upper bearing race is concentric with said small diameter upper bearing race;
   a small diameter bearings cage positioned between said small diameter upper bearing race and said small diameter lower bearing race, wherein said small diameter bearing cage comprises a plurality of circular holes;
   a large diameter bearings cage positioned between said large diameter upper bearing race and said large diameter lower bearing race, wherein said small diameter bearing cage comprises a plurality of circular holes;
   a plurality of small bearings positioned within said small diameter bearing cage;
   a plurality of large bearings positioned within said large diameter bearing cage;
   a ring gear coupled to said turner casing top, wherein said ring gear comprises a plurality of outward facing teeth;
   a hollow tube extending downward from said turner casing top into said funnel structure of said turner casing base;
   a motor drive assembly coupled with the turner casing base, wherein the motor drive assembly is configured to rotate the turner casing top relative to the turner casing base; and
   a motor controller coupled with the turner casing base, wherein the motor controller is configured to cause the motor drive assembly to rotate the turner casing top relative to the turner casing base using alternating clockwise and counter-clockwise rotational motions.

2. The rotating stand of claim 1, wherein the motor controller is further configured to cause the motor drive assembly to rotate the turner casing top a constant rotational distance in relation to the turner casing base before reversing the rotational direction.

3. The rotating stand of claim 1, wherein the motor controller is further configured to cause the motor drive assembly to rotate the turner casing top in relation to the turner casing base at an adjustable rotational speed.

4. The rotating stand of claim 3, wherein the adjustable rotational speed range is further configured to be from one revolution per minute to one revolution per day.

5. The rotating stand of claim 1, further comprising at least one solar power cell coupled with the rotating stand.

6. The rotating stand of claim 5, wherein the motor drive assembly and the motor controller are further configured to be powered by the solar power cells.

7. The rotating stand of claim 1, further comprising a photocell sensor coupled with the rotating stand, wherein the photocell sensor is configured to send electrical signals to the motor controller.

8. The rotating stand of claim 7, wherein the motor controller is further configured to cause the motor drive assembly to rotate the turner casing top relative to the turner casing base only when the photocell detects light.

9. The rotating stand of claim 1, wherein said turner casing top comprises a top surface area larger than a maximum horizontal cross-sectional area of said turner casing base.

* * * * *